(12) United States Patent
Henry

(10) Patent No.: US 7,443,403 B2
(45) Date of Patent: Oct. 28, 2008

(54) NAVIGATION CONTROL IN AN IMAGE HAVING ZOOMABLE AREAS

(75) Inventor: Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 10/773,320

(22) Filed: Feb. 9, 2004

(65) Prior Publication Data

US 2004/0183819 A1    Sep. 23, 2004

(30) Foreign Application Priority Data

Feb. 18, 2003    (FR) .................................. 03 01941

(51) Int. Cl.
*G06T 3/40* (2006.01)
(52) U.S. Cl. .................................. 345/660
(58) Field of Classification Search ................. 345/660, 345/661–667, 672, 676–682
See application file for complete search history.

(56) References Cited

U.S. PATENT DOCUMENTS

| 6,606,103 | B1 * | 8/2003 | Hamlet et al. ............... 345/660 |
| 6,873,343 | B2 * | 3/2005 | Chui ........................... 345/660 |
| 7,343,052 | B2 * | 3/2008 | Roth et al. ................... 382/299 |
| 2002/0105531 | A1 | 8/2002 | Niemi .......................... 345/660 |
| 2002/0154146 | A1 * | 10/2002 | Rodriquez et al. .......... 345/660 |
| 2003/0190158 | A1 * | 10/2003 | Roth et al. ................... 386/125 |

OTHER PUBLICATIONS

David S. Taubman, et al.: "JPEG2000: standard for interactive imaging", Proceedings of the IEEE, Aug. 2002, IEEE, USA, vol. 90, No. 8, pp. 1336-1357.*
Cheong S Ang, Peter Brantley, Michael Doyle. Polymap: A Versatile Client-Side Image Map for the Web, Proceedings of the Fourth WWW Conference at Boston, Dec. 1995, pp. 1-10.*
Cheong S Ang, Image Mapping with Polymap, pp. 1-2.*
Anonymous: "Press Release: Create flashy web images with the new Macromedia" (on-line), Jan. 22, 2003.
Corresponding French Search Report Patent Application No. FR 0301941.
Guylaine Monnier, *Flash MX*, Dunod, Paris, 2002, Chapters 14 and 17.

* cited by examiner

*Primary Examiner*—Jeffery A. Brier
(74) *Attorney, Agent, or Firm*—Fitzpatrick, Cella, Harper & Scinto

(57) ABSTRACT

A method of creating a file describing a digital image comprises the steps of defining a zoomable area in the image, a zoomable area being defined by its characteristics of location in the image and for which additional data are available, writing the characteristics in a file, and writing in the file a management function for navigation in the image.

39 Claims, 5 Drawing Sheets

NAVIGATION CONTROL IN AN IMAGE HAVING ZOOMABLE AREAS

FIELD OF THE INVENTION

The present invention concerns in general terms the control of navigation in a digital image having zoomable areas. A zoomable area is defined as an area of the image which is accessible at a greater resolution or quality than provided in the basic image for all areas, i.e. an area for which additional data are available to further define the image.

BACKGROUND OF THE INVENTION

There exist techniques for navigating in an image stored in a server, from a client terminal connected to this server. For example, the Quicktime VR technique makes it possible, amongst other things, to zoom in an image to the JPEG format. This technique is implemented in software available via the Internet through apple.com.

Thus, by virtue of this technique, it is possible, from the client terminal, to make zooms and translations in the image stored on the server. A viewing window restores the result of the navigation at the client terminal.

For this purpose, the image is stored at several resolutions in the server. The change from one resolution to a higher resolution is made by supersampling.

In this technique, there is strictly speaking no zoomable area in the image since it is the complete image which is zoomable.

In addition, there exist image compression techniques which make it possible to define zoomable areas. For example, image compression according to the JPEG2000 standard makes it possible to create one or more zoomable areas in the image. A zoomable area can be decoded at a greater resolution than the rest of the image.

Patent application US 2002/0105531 A1 describes a method for zooming in an image wherein data representing detail image information is loaded from a storage unit and used for presenting an area of the image in higher resolution.

In this document, the storage unit contains only data, which is processed according to instructions stored in the presentation device, in a fixed and predetermined manner.

SUMMARY OF THE INVENTION

The inventors of the present invention find it necessary to define rules for navigation in the image in a more flexible way, since not all the image is zoomable and not all the zoomable areas are necessarily accessible at the same resolutions.

The present invention aims to remedy at least one of the drawbacks of the prior art by providing a method and device for creating a file describing a digital image which make it possible to define at least a zoomable area in the image and to manage the navigation in the image.

The invention proposes a method of creating a file describing a digital image, comprising the steps of:

defining at least one zoomable area in the image, a zoomable area being defined by characteristics of location of said area in the image and for which additional data are available, writing said characteristics of said at least one zoomable area in a first file, writing in the first file at least one management function for navigation in the image.

The invention makes it possible to define zoomable areas in a digital image and to associate with this image functions of navigation in the image which notably take into account these zoomable areas. The navigation functions provide more flexibility for navigation. Further, instructions to process additional data need not be stored at the client terminal as they are supplemented by the navigation functions.

According to a proposed embodiment, the management function relates to at least one area of the image which is not a zoomable area. The interactivity is enhanced as non-zoomable areas are also taken into consideration by the first file.

For instance, the management function comprises a step of displaying a message.

Alternatively, the management function comprises a step of zooming said at least one area by interpolation. Although no additional data is available, the zoom takes place based on the initial data.

According to a possible implementation, the first file is a file of the SWF type.

The writing of the characteristics is for example performed by object instancing.

The method may also include steps of compression of the image and storage of the compression data in a second file, the compression data making it possible to reconstruct the image and further containing said additional data.

Such a compression is for instance of the JPEG2000 type.

When the image has a given resolution, said additional data may define at least one additional resolution for the zoomable area.

When the image has a given quality, said additional data may define at least one additional quality for the zoomable area.

The invention also proposes a method of reading a file describing a digital image comprising the steps of:

reading characteristics of at least one zoomable area in a first file, a zoomable area being defined by characteristics of location of said area in the image and for which additional data are available, receiving a navigation instruction, reading at least one management function for navigation in the image, in the first file, and executing said at least one function.

According to a possible embodiment, the method comprises a step of testing compatibility between the navigation instruction and the characteristics of said at least one zoomable area, the step of executing said at least one function occurring only if the result of the previous test is incompatibility.

According to a possible implementation, the navigation instruction is an instruction to move in the image or a zoom instruction.

Possibly, the execution of said at least one navigation function comprises the display of a message.

Alternatively, the execution of said at least one navigation function comprises a zoom by interpolation in the decoded image.

The method may comprise a step of decompressing said additional data, if the result of the compatibility test is positive.

Correspondingly, the invention concerns a device for creating a file describing a digital image, comprising: means for defining at least one zoomable area in the image, a zoomable area being defined by characteristics of location of said area in the image and for which additional data are available, means for writing said characteristics of said at least one zoomable area in a first file, means for writing in the first file at least one management function for navigation in the image.

The invention also concerns a device for reading a file describing the digital image.

The devices according to the invention comprise means of using the characteristics disclosed above.

The creation device and the reading method and device have advantages similar to those presented above.

The invention also concerns a digital apparatus including the device according to the invention or means of implementing the method according to the invention. This digital apparatus is for example a digital camera, a digital camcorder, a scanner, a printer, a photocopier or a facsimile machine. The advantages of the device and of the digital apparatus are identical to those disclosed above.

An information storage means which can be read by a computer or by a microprocessor, integrated or not into the device, possibly removable, stores a program implementing the method according to the invention.

A computer program which can be read by a microprocessor and comprising one or more sequences of instructions is able to implement the methods according to the invention.

BRIEF DESCRIPTION OF THE DRAWINGS

The characteristics and advantages of the present invention will emerge more clearly from a reading of a preferred embodiment illustrated by the accompanying drawings, in which.

DETAILED DESCRIPTION OF PREFERED EMBODIMENTS

Figure 1:
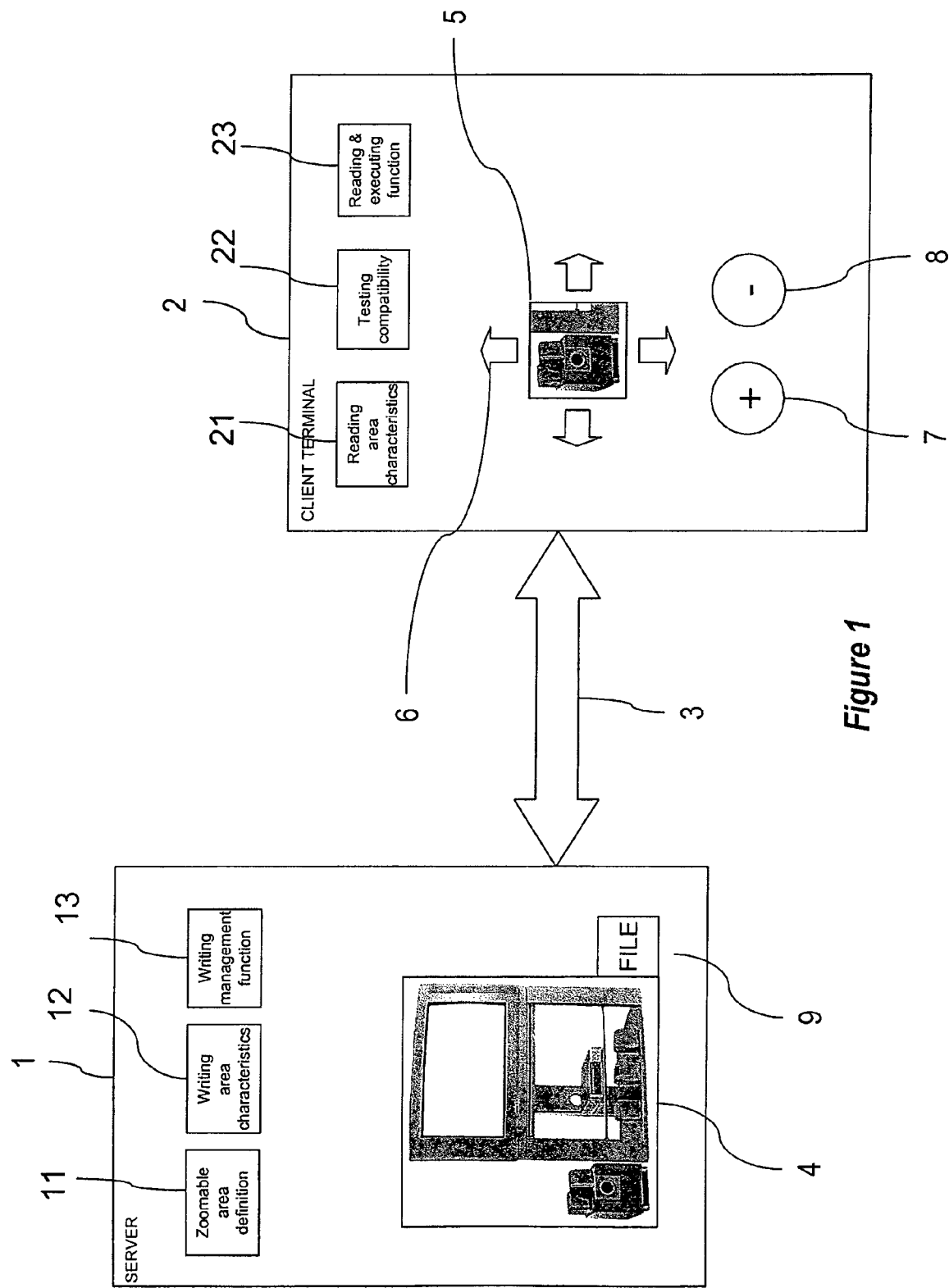
FIG. 1 depicts a device for creating a file describing a digital image according to the invention and a device for reading a file describing a corresponding digital image.

According to the chosen embodiment depicted in FIG. 1, a server 1 is connected to a client terminal 2 by means of a communications network 3. The server 1 uses the device for creating a file describing a digital image according to the invention and the client terminal 2 uses the device for reading a file describing a digital image according to the invention.

The server 1 and the client terminal 2 are computers, for which an example architecture is described below.

The client terminal 2 comprises an image display window 5, navigation buttons 6 for making translations and navigation buttons 7 for making zooms in the image.

The server 1 comprises a memory in which an image 4 is stored. It also comprises a file 9 in the SWF format, which will be detailed hereinafter. The SWF format is the so-called Flash format defined by the company Macromedia. The Flash MX software for creating content to the Flash format of this company is available via the Internet through macromedia.com.

The book entitled "Flash MX" by Guylaine Monnier, published by Dunod, Paris, 2002, describes this software.

According to the invention, the device for creating a file describing a digital image comprises:

means 11 for defining at least one zoomable area in the image, a zoomable area being defined by its characteristics of location in the image, size and at least one additional resolution or quality, the additional resolution or quality being provided by additional data, means 12 of writing characteristics of said at least one zoomable area in a first file, means 13 of writing at least one management function for navigation in the image, in the first file.

According to the invention, the device for reading a file describing a digital image coded by the above device comprises:

means 21 of reading the characteristics of said at least one zoomable area in the first file, means 6, 7, 8 of receiving a navigation instruction, means 22 of testing compatibility between the navigation instruction and the characteristics of said at least one zoomable area, means 23 of reading the management function or functions for navigation in the image, in the first file, and executing these functions, notably if the result of the previous test is incompatibility.

The management function defines an action which should occur at the client's end, for instance when the user selects a specific zone.

Figure 2:
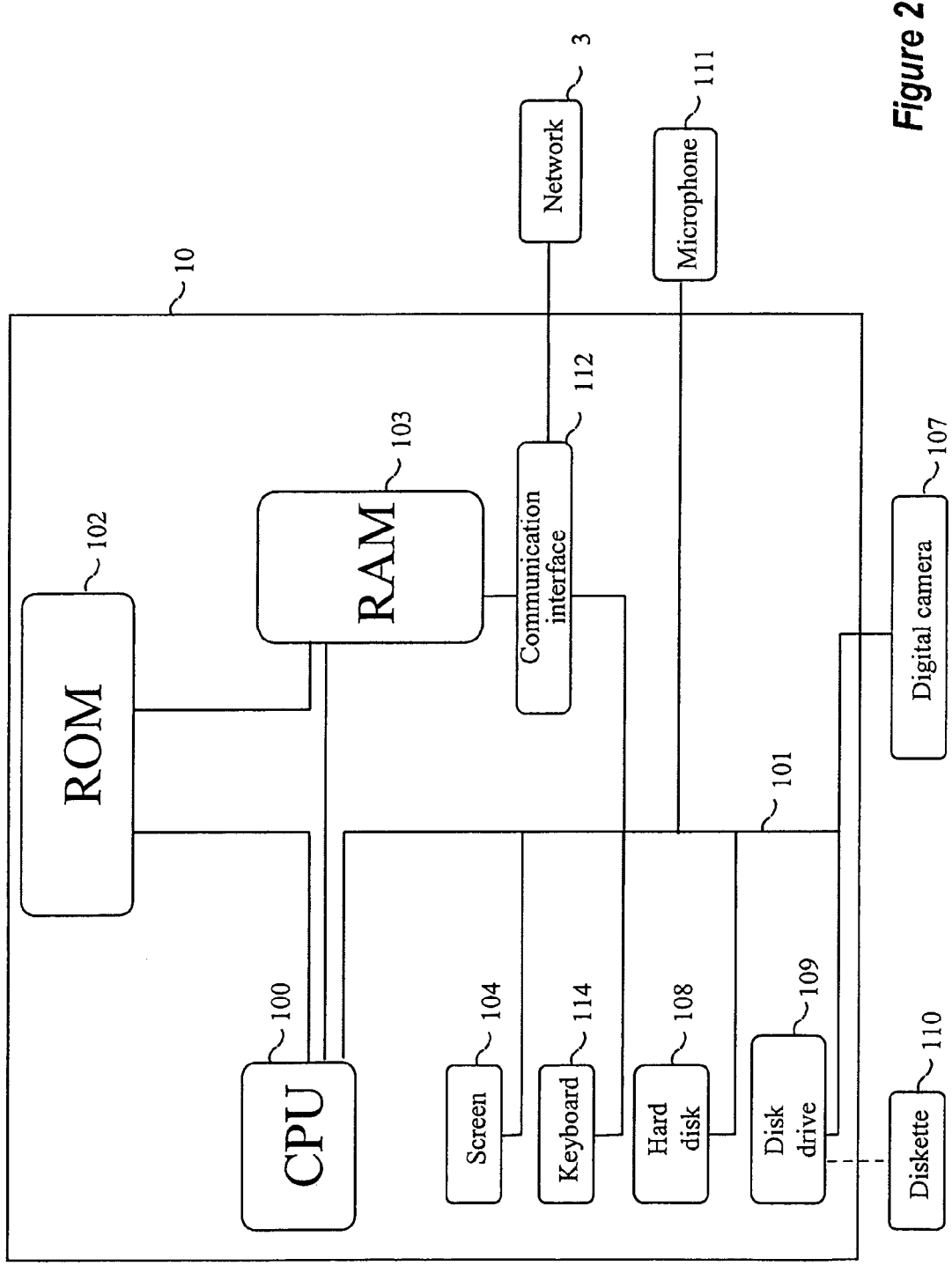
FIG. 2 depicts an embodiment of a device implementing the invention.

As depicted in FIG. 2, the server 1 is for example a microcomputer 10 connected to various peripherals, for example a digital camera 107 (or a scanner, or any image acquisition or storage means) connected to a graphics card and supplying information to be processed according to the invention.

The device 10 comprises a communication interface 112 connected to the network 3 able to transmit digital data to be processed or conversely to transmit data processed by the device. The device 10 also comprises a storage means 108 such as for example a hard disk. It also comprises a drive 109 for a disk 110. This disk 110 may be a diskette, a CD-ROM or a DVD-ROM for example. The disk 110, like the disk 108, can contain data processed according to the invention as well as the program or programs implementing the invention which, once read by the device 10, will be stored on the hard disk 108. According to a variant, the program enabling the device to implement the invention can be stored in read only memory 102 (referred to as ROM in the drawing). In a second variant, the program can be received in order to be stored in an identical fashion to that described above by means of the communication network 3.

The device 10 is connected to a microphone 111.

This same device has a screen 104 for displaying the data to be processed or serving as an interface with the user, who can thus parameterize certain processing modes, by means of the keyboard 114 or any other means (a mouse for example).

The central unit 100 (referred to as CPU in the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

In more general terms, an information storage means which can be read by a computer or by a microprocessor, integrated or not into the device, possibly removable, stores a program implementing the method according to the invention.

The communication bus 101 affords communication between the various elements included in the microcomputer 10 or connected to it. The representation of the bus 101 is not limiting and in particular the central unit 100 is able to communicate instructions to any element of the microcomputer 10 directly or by means of another element of the microcomputer 10.

The client terminal 2 is also a computer having an architecture similar to that of the server 1.

Figure 3:
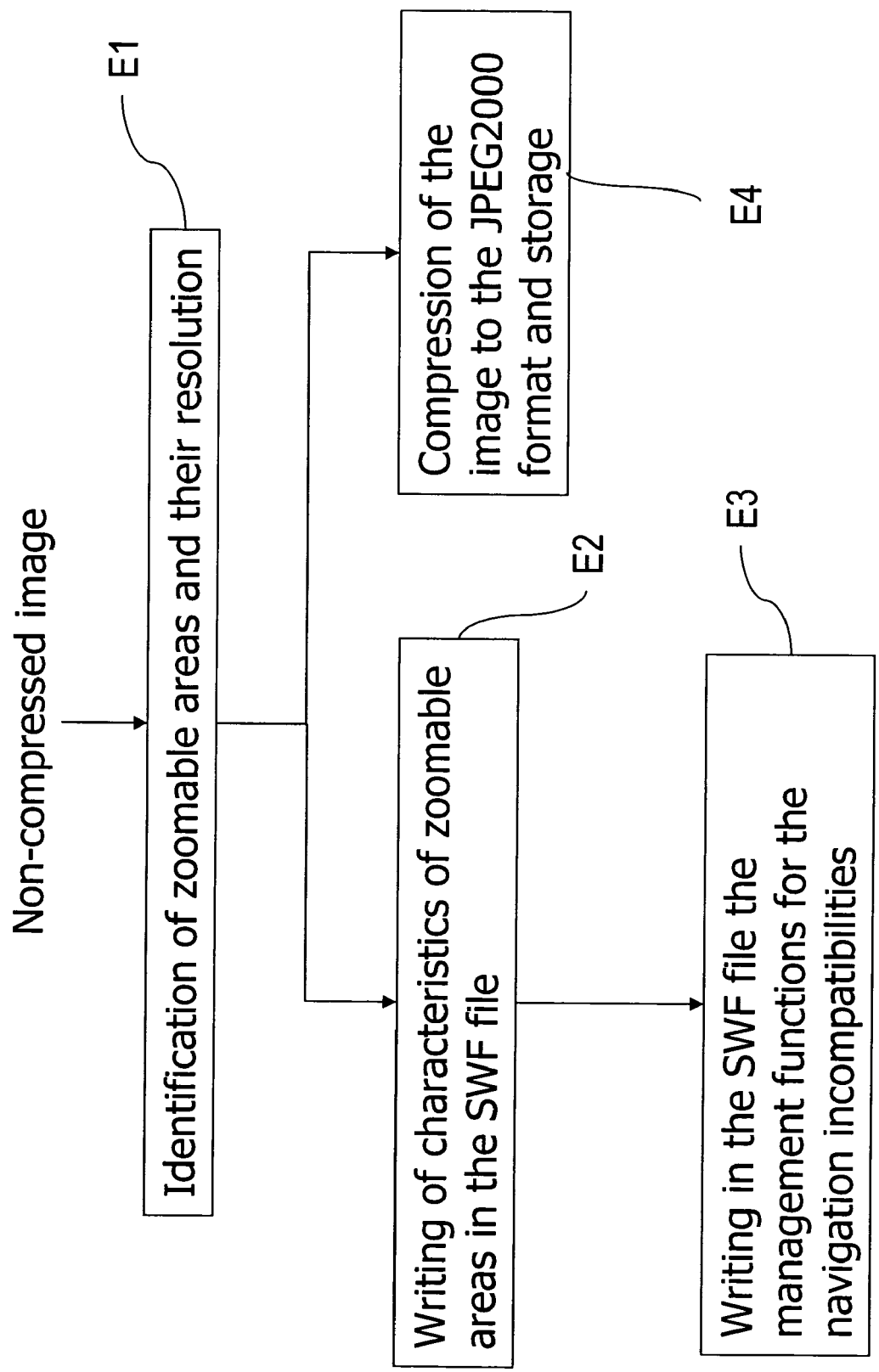
FIG. 3 depicts an embodiment of a method of creating a file describing a digital image according to the invention.

FIG. 3 depicts an embodiment of a method of creating a file describing a digital image, according to the invention. This method is implemented in the server and comprises steps E1 to E4.

The method is implemented in the form of an algorithm which can be stored in whole or in part in any information storage means capable of cooperating with the microprocessor. This storage means can be read by a computer or by a microprocessor. This storage means is integrated or not into the device and may be removable. For example, it may comprise a magnetic tape, a diskette or a CD-ROM (fixed-memory compact disk).

Figure 4:
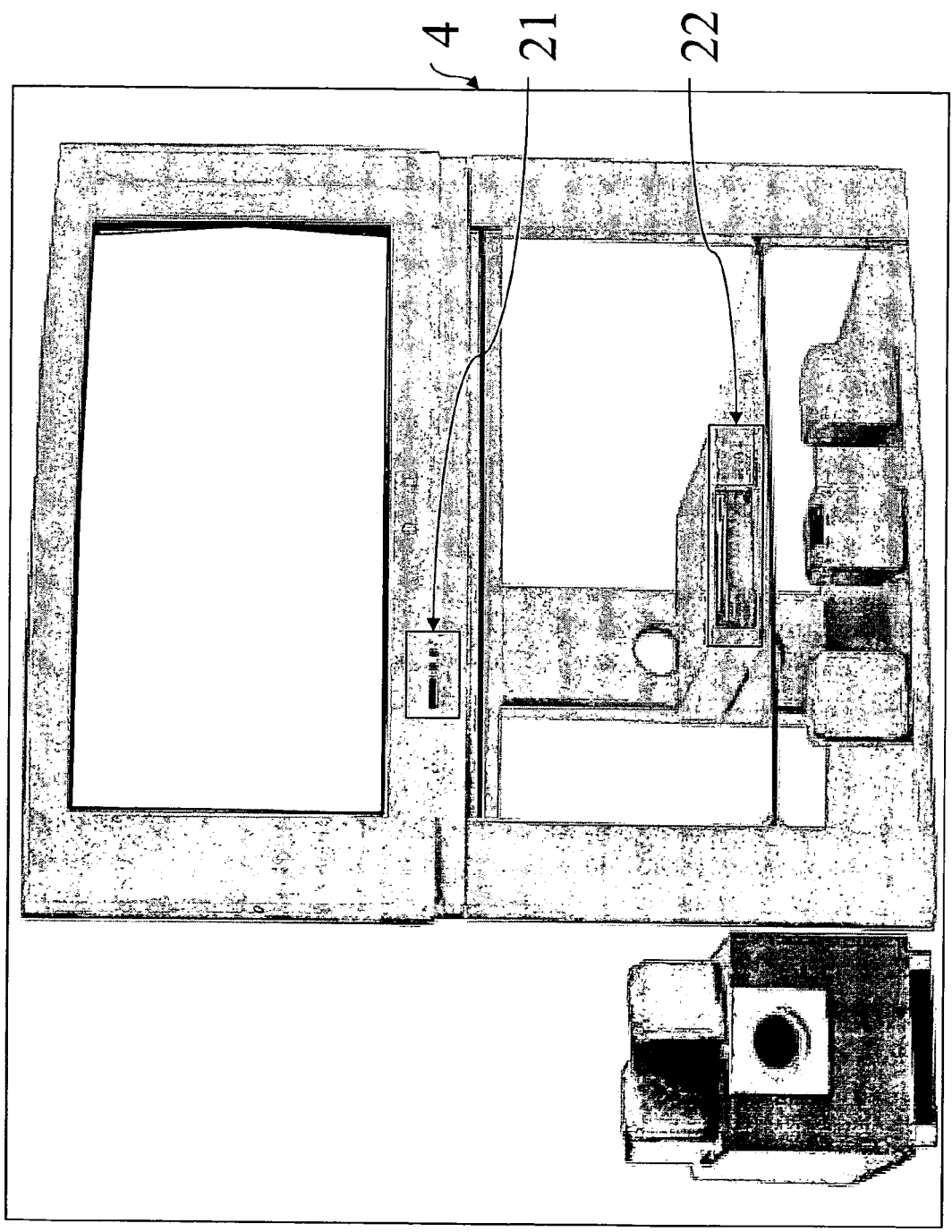
FIG. 4 depicts an image processed according to the invention.

Step E1 is the formation of at least one zoomable area in an image 4 stored in the server 1. The image 4, depicted in FIG. 4, has for example a size of 500×500 pixels.

In order to define a zoomable area, the user uses content creation software, for example the Flash MX software from Macromedia.

Thus the user defines an area 21 and an area 22. For each area he enters, for example with the keyboard, the number of additional resolution and/or quality levels accessible.

The area 21 is defined by its top right-hand corner of coordinates (200,200) in a coordinate frame related to the image 4 and by its size of 50×30 pixels.

The number of additional resolutions accessible for the area 21 is one, according to the choice of the user. Thus the user has decided that the zoomable area 21 will be accessible at the original resolution 50×30 and at the additional resolution 100×60.

Alternatively, the user could have chosen to define the number of accessible additional quality levels as being equal to one. Thus, the user would have decided that the zoomable area 21 would be accessible at the original quality level and at one superior quality level.

In a similar manner, the area 22 has its top right-hand corner at (250,400) and its size is 120×30 pixels.

The number of additional resolutions accessible for the area 21 is two, according to the choice of the user. The area 22 will therefore be accessible at the original resolution 120×30 and at the additional resolutions 240×60 and 480×120.

Step E1 is followed by step E2, at which the information relating to the zoomable areas is written in a file of the SWF type.

An SWF file is a file constructed by the content creation software and which contains instructions which can be read by the client. In particular the SWF file can contain variables to which values are allocated. The description of this procedure is to be found in the "Flash MX" guide referred to above.

More specifically, the user creates, by object-oriented programming, classes which comprise attributes. Objects are then instanced for the classes, the attributes then receiving a value.

Thus a class AreaNumber is created by the user. The class AreaNumber comprises an attribute nbr of the integer type representing the number of areas. A class AreaInfo is also created by the user. The class AreaInfo comprises the attributes x, y, sizex, sizey, resolutions representing the coordinates, the size and the number of accessible resolutions.

Alternatively, the resolution attribute can be replaced by a quality attribute.

An object N1 will be instanced for the class AreaNumber, with for example the value N1.nbr=2. Two objects Z1 and Z2 are instanced for the class AreaInfo, with the values:

Z1.x=200
Z1.y=200
Z1.sizex=50
Z1.sizey=30
Z1.resolutions=1
Z2.x=250
Z2.y=400
Z2.sizex=120
Z2.sizey=30
Z2.resolutions=2

Step E1 is also followed by step E4, which is the compression of the image according to the JPEG2000 standard. The result is a compressed file which contains all the data necessary for the subsequent decoding of the image at resolution 500×500 as well as the additional data necessary for the subsequent decoding of the zoomable areas, at the resolutions accessible for each area.

Alternatively the compressed file would contain all the data necessary for the subsequent decoding of the image at resolution 500×500 as well as the additional data necessary for the subsequent decoding of the zoomable areas, at the qualities accessible for each area, since JPEG2000 standard supports the definition of multiple incremental quality layers for a compressed image.

The compressed file is stored in the server. Either the compressed file is contained in the SWF file, or the address of the compressed file is contained in the SWF file.

Step E2 is followed by step E3, at which the management functions for the navigation incompatibilities are written in the SWF file by the content creation software.

Management functions define how the client terminal should respond to a user attempt to navigate in a specific zone or area of the image.

For instance, the purpose of these functions is to detect whether the user of the client terminal is attempting to navigate in areas, resolutions and qualities of the image which are not accessible since they do not exist in the compressed file.

These functions are implemented in ActionScript language, which makes it possible to write the SWF files. In the above example, they comprise a comparison of the requested area and its resolution with the available areas and their resolutions. In the event of incompatibility, an appropriate processing is implemented in these functions. For example, in the event of a navigation request which is incompatible with the available zoomable areas, it is possible not to execute the navigation instruction and to display a text of the "No data available for performing this action" type. This text is created by means of the createTextField( ) function available in ActionScript language. These functions, together with other examples thereof, are more detailed in the decoding part.

Figure 5:
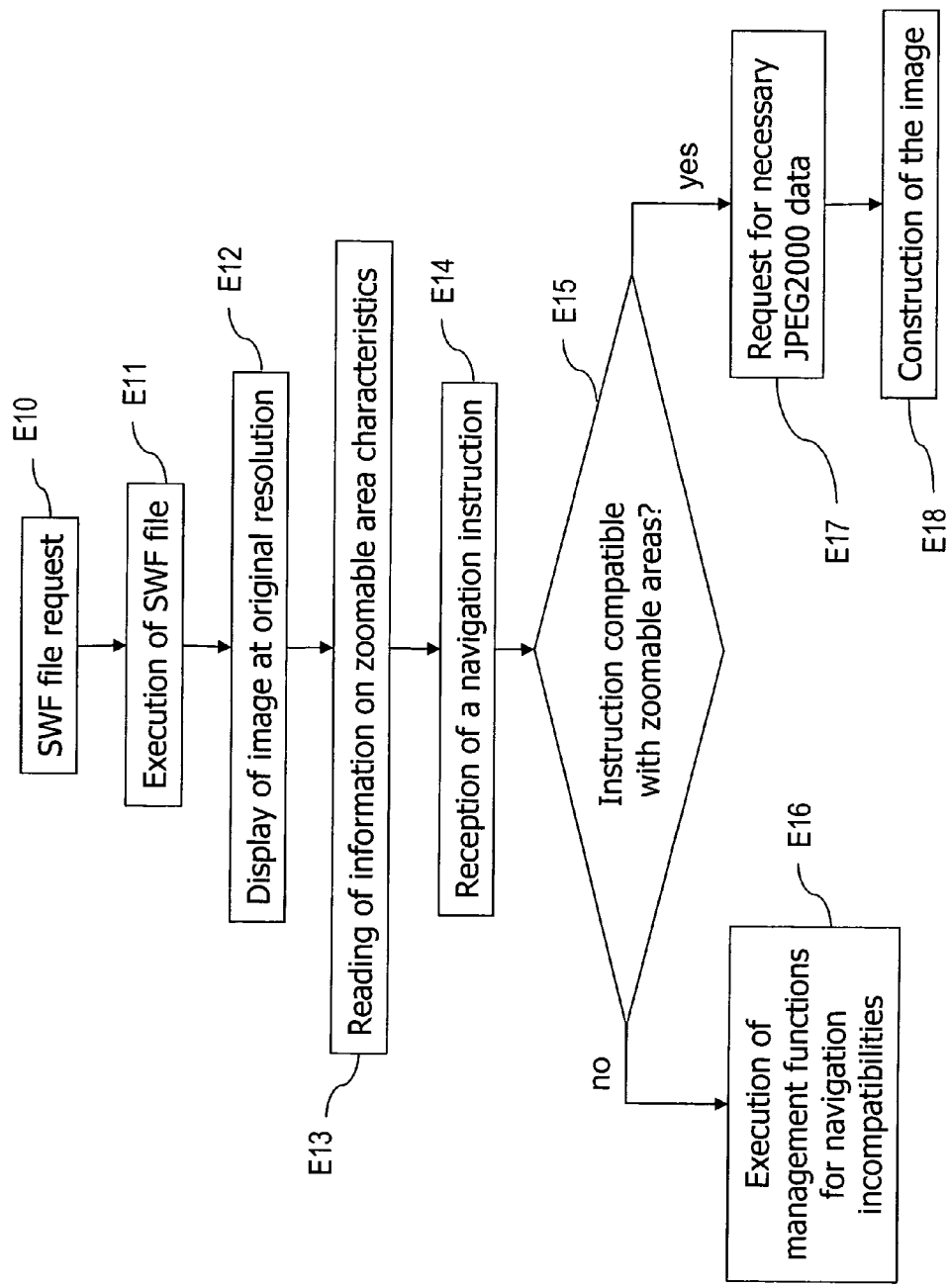
FIG. 5 depicts an embodiment of a method of reading a file describing a digital image according to the invention.

FIG. 5 depicts an embodiment of the reading method of the file describing a digital image, according to the invention. This method is implemented in the client terminal 2 and comprises steps E10 to E18.

The method is implemented in the form of an algorithm which can be stored in whole or in part in any information storage means capable of cooperating with the microprocessor. This storage means can be read by a computer or by a microprocessor. This storage means is integrated or not into the device and may be removable. For example, it may comprise a magnetic tape, a diskette or a CD-ROM (fixed-memory compact disk).

It is assumed that the user of the client terminal wishes to import the image 4 stored on the server.

Step E10 is a request made at the client terminal in order to obtain the SWF file 9 corresponding to the image 4 and stored on the server 1. The SWF file 9 is transmitted via the network 3 and then received by the client terminal 2.

The following step E11 is the execution of the SWF file. In particular, during its execution, some of the data in the JPEG2000 compressed file stored on the server are imported onto the client terminal and decoded in order to display part of the available image at resolution 500×500. For example, it is chosen to import and display the area of 10×10 pixels whose top right-hand corner is situated at the coordinates (210,210) of the initial image.

The following step E12 is the displaying of the area of the image which was imported at the previous step.

The following step E13 is the reading of the zoomable area information in the SWF file.

The following step E14 is the reception of a navigation instruction. The navigation instruction may be a translation instruction controlled by means of the buttons 6 or a front or rear zoom instruction controlled by means of the buttons 7 and 8.

The following step E15 is a compatibility test in order to determine whether the navigation instruction is compatible with the zoomable areas of the image.

For this, the characteristics of the requested area are determined. These characteristics are the resolution, the quality and the coordinates in this resolution of the requested area. If the requested resolution is not the initial resolution of the image, the characteristics of the zoomable areas are determined. It is then tested whether the requested area is entirely within a zoomable area.

For example, the display window 5 on the client terminal 2 corresponds to an area of size 10×10 pixels whose top left-hand corner has the coordinates (210,210) in the image at its initial resolution.

It is assumed that the user clicks on the button 7, thus requiring a zoom of the image 5. This is a zoom by a factor of 2 in each dimension, which defines the resolution required by the user.

First of all, the compatibility test comprises the determination of the characteristics of the area requested: the size is 20×20 pixels and the coordinates of the top right-hand corner are (420,420) in the zoomed image.

Next the compatibility test comprises the determination of the characteristics of the zoomable areas at the requested resolution. At this resolution, two zoomable areas exist. The first corresponds to the area 21. It has a size of 100×60 pixels and its top left-hand corner is at (400,400) at the resolution requested. The second zoomable area corresponds to the area 22. It has a size of 240×60 and its top left-hand corner is at (500,800).

The requested area is entirely included within the first zoomable area (100×60 pixels at (400,400)). The action is then defined as compatible with the instruction given.

It is assumed that, secondly, the user clicks on the navigation buttons 6 so as to translate the display window by 40 pixels upwards.

The compatibility test once again comprises the steps described above: determination of the characteristics of the area requested (20×20 pixels at (380,420)), determination of the characteristics of the zoomable areas at the current resolution (two zoomable areas exist, one of size 100×60 pixels whose top left-hand corner is at (400,400) at the resolution requested, and one with a size of 240×60 whose top left-hand corner is at (500,800)).

The area requested is not entirely within a zoomable area. The action is then defined as incompatible with the instruction given.

When there is no compatibility between the navigation instruction and the zoomable areas, step E15 is followed by the step E16 of executing the management functions for the navigation incompatibilities in the SWF file. The management functions determine which actions should be undertaken when the user wants to access (i.e. gives a navigation instruction leading to) the requested area at the requested resolution and quality. For example, such a function may simply display a message "No data available for performing this action".

In the case where a zoom is requested while no additional data for increasing the resolution or the quality is available since the area is not zoomable, another possibility of management incompatibility is to perform a zoom by interpolation. This means that the image will be enlarged by artificially increasing the number of pixels without repatriating additional data from the server.

When there is compatibility between the navigation instruction and the zoomable areas, step E15 is followed by step E17, which is a request to the server to have sent to it the additional data in the compressed file corresponding to the new area requested in the display window. According to the JPEG2000 standard, the coding data are organized in blocks of data which correspond to a certain resolution and a certain quality of the image and to a certain spatial location of the image at this resolution and quality. In order to display the area of 20×20 pixels where the coordinates of the top right-hand corner are (420,420) in the zoomed image, it suffices to recover the blocks of data associated with this area. These blocks are decoded in a conventional manner.

The following step E18 is the construction and display of the image requested by the user.

Naturally the present invention is in no way limited to the embodiments described and depicted but encompasses any variant within the capability of persons skilled in the art.

The invention claimed is:

1. A method comprising the steps of:
    defining at least one zoomable area in a digital image, a zoomable area being defined by characteristics of location of the area in the image and for which additional data defining the image at a greater quality or resolution are available;
    writing the characteristics of the at least one zoomable area in a first file; and
    writing in the first file instructions in a language executable by a client terminal computer, said instructions being adapted to cause the client terminal computer to perform a management function for navigation in the image when executed by the client terminal computer.

2. The method according to claim 1, wherein the at least one management function relates to at least one area of the image which is not a zoomable area.

3. The method according to claim 2, wherein the at least one management function comprises a step of displaying a message.

4. The method according to claim 2, wherein the at least one management function comprises a step of zooming the at least one area by interpolation.

5. The method according to claim 1, wherein the first file is an SWF file.

6. The method according to claim 1, wherein the writing of the characteristics is performed by object instancing.

7. The method according to claim 1, further comprising the steps of compression of the image and storage of the compression data in a second file, different from the first file, the compression data enabling reconstruction of the image and further containing the additional data.

8. The method according to claim 7, wherein the compression comprises JPEG2000 compression.

9. The method according to claim 1, wherein the image has a given resolution and wherein the additional data define at least one additional resolution for the zoomable area.

10. The method according to claim 1, wherein the image has a given quality and wherein the additional data define at least one additional quality for the zoomable area.

11. A reading method implemented in a client terminal computer, comprising the steps of:
    reading characteristics of at least one zoomable area in a first file, a zoomable area being defined by characteristics of location of said area in a digital image and for which additional data defining the image at a greater quality or resolution are available;
    receiving a navigation instruction for the display of an area of the digital image;
    reading instructions in a language executable by the client terminal computer, in the first file; and
    executing said instructions thereby performing a management function for navigation in the image.

12. The method of claim 11, further comprising the step of testing compatibility between the navigation instruction and the characteristics of the at least one zoomable area,
    wherein the step of executing the at least one management function occurs only if the result of said testing step is incompatibility.

13. The method according to claim 11, wherein the navigation instruction comprises an instruction included in a list consisting of an instruction to move in the image and a zoom instruction.

14. The method according to claim 11, wherein said step of execution of the at least one management function comprises display of a message.

15. The method according to claim 11, wherein said step of executing the at least one management function comprises a zoom by interpolation in a decoded image.

16. The method according to claim 12, further comprising the step of decompressing the additional data, if the result of the compatibility test is positive.

17. A device comprising:
    a defining device configured to define at least one zoomable area in a digital image, a zoomable area being defined by characteristics of location of the area in the image and for which additional data defining the image at a greater quality or resolution are available;
    a characteristic writing device configured to write the characteristics of the at least one zoomable area in a first file; and
    a management-function writing device configured to write in the first file instructions in a language executable by a client terminal computer, said instructions being adapted to cause the client terminal computer to perform a management function for navigation in the image when executed by the client terminal computer.

18. The device according to claim 17, wherein the management function relates to at least one area of the image which is not a zoomable area.

19. The device according to claim 18, wherein the management function comprises display of a message.

20. The device according to claim 18, wherein the management function comprises a zoom in the at least one area by interpolation.

21. The device according to claim 17, wherein the first file is an SWF file.

22. The device according to claim 17, wherein said device configured to write the characteristics comprises a device configured to perform object instancing.

23. The device according to claim 17, further comprising a compression device configured to compress the image and store the compression data in a second file, different from the first file, the compression data enabling reconstruction of the image and further containing the additional data.

24. The device according to claim 23, wherein the compression comprises JPEG2000 compression.

25. The device according to claim 17, wherein the image has a given resolution and wherein the additional data define at least one additional resolution for the zoomable area.

26. The device according to claim 17, wherein the image has a given quality and wherein the additional data define at least one additional quality for the zoomable area.

27. A reading device implemented in a client terminal computer, comprising:
    a device configured to read characteristics of at least one zoomable area in a first file, a zoomable area being defined by characteristics of location of the area in a digital image and for which additional data defining the image at a greater quality or resolution are available;
    a receiving device configured to receive a navigation instruction for the display of an area of the digital image;
    a reading device configured to read instructions in a language executable by the client terminal computer, in the first file; and
    an executing device configured to execute said instructions, thereby performing a management function for navigation in the image.

28. The device of claim 27, further comprising:
    a testing device configured to test compatibility between the navigation instruction and the characteristics of the at least one zoomable area,
    wherein execution of the management function occurs only if the result from said testing device is incompatibility.

29. The device according to claim 27, wherein the instructions comprises an instruction included in a list consisting of an instruction to move in the image and a zoom instruction.

30. The device according to claim 27, wherein execution of the management function comprises display of a message.

31. The device according to claim 27, wherein execution of the management function comprises a zoom by interpolation in a decoded image.

32. The device according to claim 28, further comprising the step of decompressing the additional data, if the result from said testing device is positive.

33. The device according to claim 17, wherein said defining device and said characteristic writing device are incorporated in a microprocessor, a read only memory containing a program for processing the data, and a random access memory containing registers adapted to record the variables modified during execution of the program.

34. The device according to claim 27, wherein said reading device, said receiving device and said executing device are incorporated in a microprocessor, a read only memory containing a program for processing the data, and a random access memory containing registers adapted to record variables modified during execution of the program.

35. A digital image processing apparatus adapted to implement the method according to claim 1 or 11.

36. A digital image processing apparatus comprising the device according to claim 17 or 27.

37. An information storage device readable by a computer or by a microprocessor, and storing a program executed by the computer or microprocessor to effect the method according to claim 1 or 11.

38. A method according to claim 1, wherein the computer-executable language is a scripting language.

39. The method of claim 11, further comprising the step of testing whether the area to be displayed is entirely within said at least one zoomable area and wherein said instructions are executed if the result of the testing step is negative.

* * * * *